(12) United States Patent
Qureshi et al.

(10) Patent No.: US 8,090,108 B2
(45) Date of Patent: Jan. 3, 2012

(54) SECURE DEBUG INTERFACE AND MEMORY OF A MEDIA SECURITY CIRCUIT AND METHOD

(75) Inventors: Amjad Qureshi, San Jose, CA (US);
Babu Chilukuri, Cupertino, CA (US)

(73) Assignee: Adaptive Chips, Inc., Cupertino, CA (US)

( * ) Notice: Subject to any disclaimer, the term of this patent is extended or adjusted under 35 U.S.C. 154(b) by 932 days.

(21) Appl. No.: 12/102,878

(22) Filed: Apr. 15, 2008

(65) Prior Publication Data
US 2009/0257594 A1 Oct. 15, 2009

(51) Int. Cl.
*H04L 9/00* (2006.01)
(52) U.S. Cl. .................... 380/281; 380/277; 380/239
(58) Field of Classification Search .................. 380/239, 380/264, 281, 284, 277; 726/26, 27; 713/189, 713/190
See application file for complete search history.

(56) References Cited

U.S. PATENT DOCUMENTS

| | | | |
|---|---|---|---|
| 6,715,085 B2 * | 3/2004 | Foster et al. | 726/27 |
| 6,957,335 B2 * | 10/2005 | Foster et al. | 713/171 |
| 7,089,419 B2 * | 8/2006 | Foster et al. | 713/166 |
| 7,925,895 B2 * | 4/2011 | Kanazawa et al. | 713/193 |
| 2003/0081785 A1 * | 5/2003 | Boneh et al. | 380/277 |
| 2003/0182565 A1 * | 9/2003 | Nakano et al. | 713/193 |
| 2004/0172538 A1 * | 9/2004 | Satoh et al. | 713/175 |
| 2009/0034714 A9 * | 2/2009 | Boneh et al. | 380/28 |
| 2009/0202068 A1 * | 8/2009 | Qureshi et al. | 380/44 |

* cited by examiner

*Primary Examiner* — Krisna Lim
(74) *Attorney, Agent, or Firm* — Raj Abhyanker, P.C.

(57) ABSTRACT

A method, system and apparatus of a secure debug interface and memory of a media security circuit and method are disclosed. In one embodiment, a host processor, an external hardware circuit to encrypt an incoming data bit communicated to a debug interface using a debug master key stored at a pointer location of a memory (e.g., the memory may be any one of a flash memory and/or an Electrically Erasable Programmable Read-Only Memory (EEPROM)) and to decrypt an outgoing data bit from the debug interface using the debug master key, and a media security circuit having the debug interface to provide the pointer location of the memory having the debug master key to the external hardware circuit.

20 Claims, 7 Drawing Sheets

| SIGNAL 402 | DIR 404 | TO/FROM 406 | DESCRIPTION 408 |
|---|---|---|---|
| AHB MASTER I/F | | | THIS BLOCK CAN ACT AS MASTER ON THE AHB BUS |
| TDI | IN | I/O PAD | JTAG DATA INPUT |
| TDO | OUT | I/O PAD | JTAG DATA OUTPUT |
| TCK | IN | I/O PAD | JTAG CLOCK |
| TMS | IN | I/O PAD | JTAG MODE SELECT |
| TRST_N | IN | I/O PAD | JTAG RESET (LOW TRUE) |
| SCAN CONTROL SIGNALS | | | TO BE DEFINED |

DEBUG INTERFACE SIGNAL 450

SECURE DEBUG INTERFACE AND MEMORY OF A MEDIA SECURITY CIRCUIT AND METHOD

FIELD OF TECHNOLOGY

This disclosure relates generally to the technical field of communications and, in one example embodiment, to a method, apparatus, and system of a secure debug interface and memory of a media security circuit.

BACKGROUND

A debug interface (e.g., a Joint Test Action Group interface) may be used by a programmer to debug software designed to operate with a circuit (e.g., an application specific integrated circuit, a media security circuit, etc.). The debug interface (e.g., the JTAG interface) may also be used install an application (e.g., an operating system, a firmware code, etc.) and/or to upload data on the circuit (e.g., different profiles on the media security circuit).

The circuit may have associated with it a flash memory (e.g., a form of rewritable computer memory that holds its content without power) to store content. In addition, the circuit may include an Electrically Erasable Programmable Read-Only Memory (e.g., an EEPROM memory). The EEPROM memory may be used to store small amounts of data when power is removed to the circuit (e.g., a calibration table, a device configuration data, etc.)

A hacker (e.g., one who uses programming skills to gain illegal access) may surreptitiously retrieve the content through the debug interface, the flash memory and/or the EEPROM circuit. The hacker may then gain access to a work of authorship (e.g., a movie, a record, a book, a software application, etc.) associated with the content. The hacker may then broadcast, duplicate and/or disseminate the work of authorship without permission of a content provider (e.g., a studio, a record label, a publisher, a developer etc.). As a result, the content provider may lose the protection of the work of authorship and may lose revenue.

SUMMARY

A method, system and apparatus of a secure debug interface and memory of a media security circuit may be disclosed. In one aspect, the system includes a host processor, an external hardware circuit to encrypt an incoming data bit communicated to a debug interface using a debug master key stored at a pointer location of a memory (e.g., may be a flash memory and/or an Electrically Erasable Programmable Read-Only Memory (EEPROM)) and to decrypt an outgoing data bit from the debug interface using the debug master key, and a media security circuit having the debug interface to provide the pointer location of the memory having the debug master key to the external hardware circuit.

The debug master key may be stored in multiple locations of the memory (e.g., multiple pointer locations may be provided by the media security circuit to the external hardware circuit referencing each of the multiple locations, and such that the external hardware circuit reconstructs the debug master key by retrieving data from the multiple locations of the memory). Information between the media security circuit and the flash memory may be encrypted other than the debug master key of the pointer location. Information between the media security circuit and the EEPROM may be encrypted other than the debug master key of the pointer location.

Information between the media security circuit and the EEPROM and the flash memory may be encrypted using an Advanced Encryption Standard (AES) algorithm. The pointer location may be changed in the memory based on a time duration event, a number of times accessed event, a user-defined event, and/or a scheduled event. The debug master key may be securely programmed in the external hardware circuit (e.g., such that the external hardware circuit may not need to receive the debug master key from the pointer location).

In another aspect, a method of a media security circuit includes generating a debug master key, storing the debug master key in a location of a memory device, communicating a pointer to the location of the memory device to an external hardware circuit, and processing an input data encrypted with the debug master key from the external hardware circuit through a debug interface of the media security circuit, encrypting an output data responsive to the input data from the media security circuit to the external security circuit using the debug master key, and periodically changing the location of the memory device based on an event.

The method may include encrypting a data between the media security circuit and the memory device using a flash master key when the memory device is a flash device, and/or an EEPROM master key when the memory device is an EEPROM device. The method may also include storing the debug master key in multiple locations of the memory device (e.g., may include a flash memory and/or an EEPROM, etc.), and providing multiple pointer locations to the external hardware circuit referencing each of the multiple locations of the memory device (e.g., such that the external hardware circuit may reconstruct the debug master key by retrieving data from the multiple locations of the memory device).

The method may further include encrypting all information between the media security circuit and the flash memory other than the debug master key of the pointer location. The method may include encrypting all information between the media security circuit and the EEPROM other than the debug master key of the pointer location. Information between the media security circuit and the EEPROM and the flash memory may be encrypted using an Advanced Encryption Standard (AES) algorithm.

The method may also include changing the pointer location in the memory based on a time duration event, a number of times accessed event, a user-defined event, and/or a scheduled event. The debug master key may be securely programmed in the external hardware circuit such that the external hardware circuit may not need to receive the debug master key from the pointer location.

In yet another aspect, the media security circuit includes a debug encryption module to encrypt and a debug decryption module to decrypt an information communicated between the media security circuit and an external hardware circuit (e.g., may include the debug encryption module and the debug decryption module) using a debug master key (e.g., may be securely programmed in the external hardware circuit), a flash encryption module to encrypt and a flash decryption module to decrypt a content information communicated between the media security circuit and a flash device, and a EEPROM encryption module to encrypt and an EEPROM decryption module to decrypt a stored information communicated between the media security circuit and an EEPROM device.

The methods, system, and apparatuses disclosed herein may be implemented in any means for achieving various aspects, and may be executed in a form of machine-readable medium embodying a set of instruction that, when executed by a machine, causes the machine to perform any of the operation disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
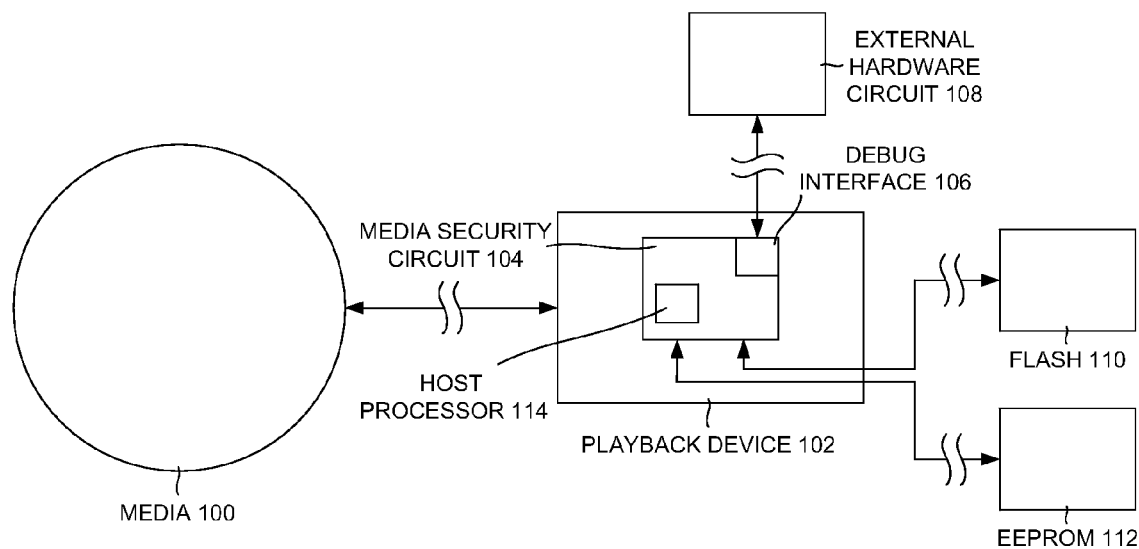
FIG. 1 is system view of media communicating with the external hardware circuit through playback device, according to one embodiment.

Other features of the present embodiments will be apparent from the accompanying drawings and from the detailed description that follows.

DETAILED DESCRIPTION

A method, apparatus and system of a secure debug interface and memory of a media security circuit are disclosed. In the following description, for the purposes of explanation, numerous specific details are set forth in order to provide a thorough understanding of the various embodiments. It will be evident, however to one skilled in the art that the various embodiments may be practiced without these specific details In one embodiment, the system includes a host processor, an external hardware circuit (e.g., the external hardware circuit 108 of FIG. 1) to encrypt an incoming data bit communicated to a debug interface (e.g., the debug interface 106 of FIG. 1) using a debug master key stored at a pointer location of a memory (e.g., flash 110 and/or EEPROM 112 of FIG. 1) and to decrypt an outgoing data bit from the debug interface 106 using the debug master key, and a media security circuit (e.g., the media security circuit 104 of FIG. 1) having the debug interface 106 to provide the pointer location of the memory (e.g., flash 110 and/or EEPROM 112 of FIG. 1) having the debug master key to the external hardware circuit 108.

In another embodiment, a method of media security circuit (e.g., the media security circuit 104 of FIG. 1) includes generating a debug master key, storing the debug master key in a location of a memory device (e.g., flash 110 and/or EEPROM 112 of FIG. 1), communicating a pointer to the location of the memory device (e.g., flash 110 and/or EEPROM 112 of FIG. 1) to an external hardware circuit (e.g., the external hardware circuit 108 of FIG. 1), and processing an input data encrypted with the debug master key from the external hardware circuit 108 through a debug interface (e.g., the debug interface circuit 106 of FIG. 1) of the media security circuit 104, encrypting an output data responsive to the input data from the media security circuit 104 to the external security circuit using the debug master key, and periodically changing the location of the memory device based on an event.

In yet another embodiment, a media security circuit (e.g., the media security circuit 104 of FIG. 1) includes a debug encryption module (e.g., the debug encryption module 202 of FIG. 2) to encrypt and a debug decryption module (e.g., the debug decryption module 204 of FIG. 2) to decrypt an information communicated between the media security circuit 104 and an external hardware circuit (e.g., the external hardware circuit 108 of FIG. 1) using a debug master key, a flash encryption module (e.g., the flash encryption module 206 of FIG. 2) to encrypt and a flash decryption module (e.g., the flash decryption module 208 of FIG. 2) to decrypt a content information communicated between the media security circuit 104 and a flash device (e.g., the flash 110 of FIG. 1) and an EEPROM encryption module (e.g., the EEPROM encryption module 210 of FIG. 2) to encrypt and an EEPROM decryption module (e.g., the EEPROM decryption module 212 of FIG. 2) to decrypt a stored information communicated between the media security circuit 104 and an EEPROM device (e.g., the EEPROM 112 of FIG. 1).

FIG. 1 is system view of media communicating with an external hardware circuit 108 through a playback device 102, according to one embodiment. Particularly FIG. 1 illustrates a media 100, a playback device 102, a media security circuit 104, a debug interface 106, an external hardware circuit 108, a flash 110, an EEPROM 112, and a host processor 114, according to one embodiment.

The media 100 may be a HD-DVD disk, a CD ROM and/or television which may consist of media content. In an alternate embodiment, the media may be received via any networking protocol (e.g., wireless or wired protocol). The playback device 102 may be a personal computer, a television, a standalone media player, a mobile audio/video player, a mobile phone, and/or a kiosk. The media security circuit 104 may generate a debug master key to encrypt the media data. The debug interface 106 may be JTAG interface etc. It may be an interface between peripheral cores and debugger/emulator. The external hardware circuit 108 (e.g., FPGA) may be used to encrypt an incoming data bit communicated to a debug interface 106. The flash 110 may be a form of rewritable computer memory that may hold a pointer location of debug master key. The EEPROM 112 may be a non-volatile memory device used to store the pointer location of a debug master key. The host processor 114 may be used for processing of data (e.g., encryption and/or decryption data).

In an example embodiment, the media 100 of FIG. 1 may communicate with the external hardware circuit 108 through the playback device 102 (e.g., which includes the media security 104) to encrypt the incoming data of playback device 102 (e.g., television, personal computer, standalone media player). The flash 110 and the EEPROM 112 may be memory devices used to store the pointer location to the debug master key.

In one embodiment, the external hardware circuit 108 may encrypt an incoming data bit communicated to a debug interface 106 using a debug master key stored at a pointer location of a memory (e.g., the flash 110 and/or the EEPROM 112 of FIG. 1) and to decrypt an outgoing data bit from the debug interface 106 using the debug master key, and the media security circuit 104 may have the debug interface 106 to provide the pointer location of the memory (e.g., the flash 110 and/or the EEPROM 112 of FIG. 1) having the debug master key to the external hardware circuit 108.

The debug master key may be stored in multiple locations of the memory (e.g., the flash 110, the EEPROM 112, etc.) such that multiple pointer locations may be provided by the media security circuit 104 to the external hardware circuit 108 (e.g., FPGA, etc.) referencing each of the multiple locations (e.g., like the flash 110, the EEPROM, etc), and/or such that the external hardware circuit 108 (e.g., FPGA, etc.) may reconstruct the debug master key by retrieving data from the multiple locations of the memory (e.g., the flash 110, the EEPROM 112, etc). The memory may be any one of a flash memory (e.g., the flash 110 of FIG. 1) and/or an Electrically Erasable Programmable Read-Only Memory (EEPROM) (e.g., the EEPROM 112 of FIG. 1).

Information (e.g., data, records, etc) between the media security circuit 104 and the flash memory (e.g., the flash 110 of FIG. 1) may be encrypted (e.g., using the Advanced Encryption Standard (AES) algorithm) other than the debug master key of the pointer location. Information between the media security circuit 104 and the EEPROM 112 may be encrypted (e.g., using the Advanced Encryption Standard (AES) algorithm) other than the debug master key of the pointer location (e.g., indicator location in memory). Information between the media security circuit 104 and the EEPROM 112 and the flash memory 110 may be encrypted using an Advanced Encryption Standard (AES) algorithm (e.g., using encryption algorithm module 200 of FIG. 2).

The pointer location may be changed in the memory (flash 110 and EEPROM 112) based on a time duration event, a number of times accessed event, a user-defined event, and/or a scheduled event. The debug master key may be securely programmed in the external hardware circuit 108 (e.g., FPGA) such that the external hardware circuit 108 may not need to receive the debug master key from the pointer location (e.g., from the flash 110, EEPROM 112, etc.).

The debug master key may be generated (e.g., using the media security circuit 104 of FIG. 1). The debug master key (e.g., may be securely programmed in the external hardware circuit 108) may be stored in a location of a memory device (e.g., the flash 110, the EEPROM 112 etc.). A pointer may be communicated to the location of the memory device (e.g., the flash 110, the EEPROM 112 etc.) to an external hardware circuit 108. An input data encrypted with the debug master key may be processed from the external hardware circuit 108 through a debug interface 106 (e.g., JTAG, etc.) of the media security circuit 104.

An output data responsive to the input data may be encrypted from the media security circuit 104 to the external security circuit 108 using the debug master key. The location of the memory device (e.g., the flash 110, the EEPROM 112 etc.) based on an event may be periodically changed. A data (e.g., information, records, etc.) between the media security circuit 104 and the memory device (e.g., the flash 110, the EEPROM 112 etc.) may be encrypted using a flash master key when the memory device is a flash device 110 and an EEPROM master key when the memory device is an EEPROM device 112.

The debug master key may be stored in multiple locations of the memory device (e.g., the flash 110, the EEPROM 112 etc.) and providing multiple pointer locations to the external hardware circuit 108 (e.g., FPGA, etc.) referencing each of the multiple locations of the memory device (e.g., such that the external hardware circuit 108 reconstructs the debug master key by retrieving data from the multiple locations of the memory device). The memory device may be the flash memory 110 and/or the EEPROM 112.

The information between the media security circuit 104 and the flash memory (e.g., flash 112) may be encrypted (e.g., using the Advanced Encryption Standard (AES) algorithm) other than the debug master key of the pointer location. The information between the media security circuit 104 and the EEPROM 112 may be encrypted other than the debug master key of the pointer location. The information between the media security circuit 104 and the EEPROM 112 and the flash memory (e.g., flash 112) may be encrypted using an Advanced Encryption Standard (AES) algorithm (e.g., using the encryption algorithm module 200 of FIG. 2).

The pointer location may be changed in the memory (e.g., the flash 110, the EEPROM 112 etc.) based on the time duration event, the number of times accessed event, the user-defined event, and/or the scheduled event. The debug master key may be securely programmed in the external hardware circuit 108 (e.g., FPGA, etc.) such that the external hardware circuit 108 (e.g., FPGA, etc.) may not need to receive the debug master key from the pointer location.

Figure 2:
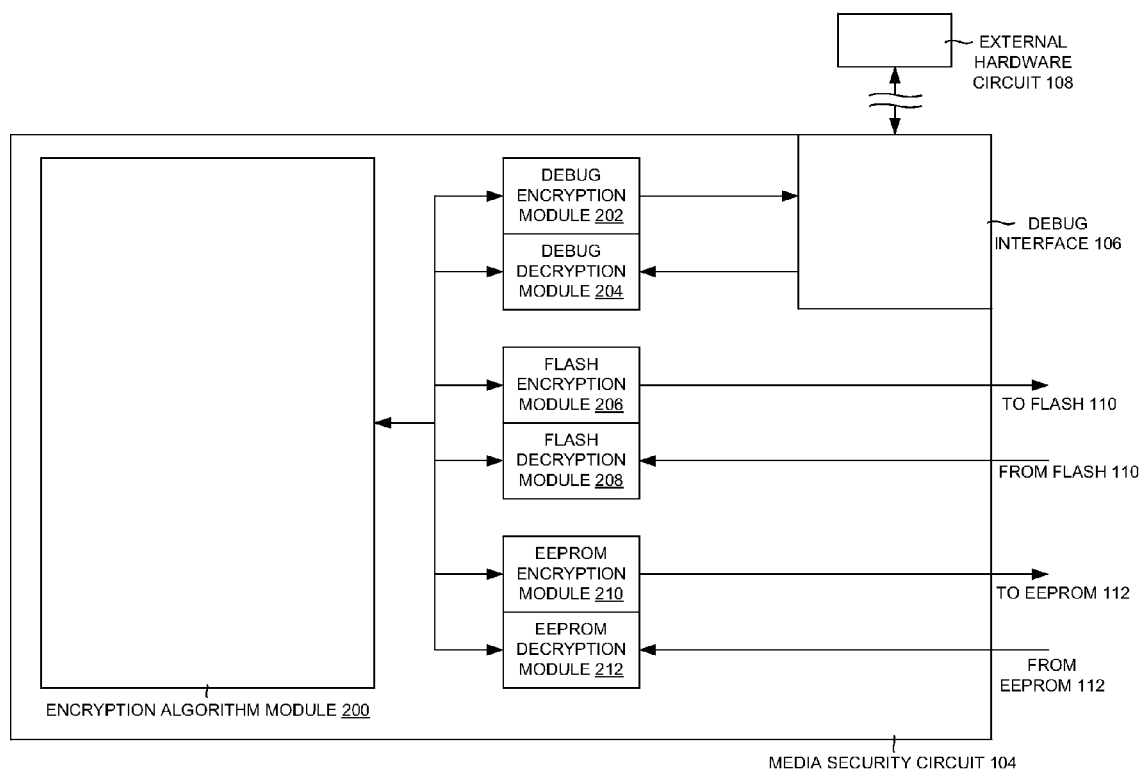
FIG. 2 is an exploded view of media security circuit of FIG. 1, according to one embodiment.

FIG. 2 is an exploded view of media security circuit of FIG. 1, according to one embodiment. Particularly FIG. 2 illustrates the media security circuit 104, the debug interface 106, the external hardware circuit 108, the flash 110, the EEPROM 112, an encryption algorithm module 200, a debug encryption module 202, a debug decryption module 204, a flash encryption module 206, a flash decryption module 208, an EEPROM encryption module 210, and an EEPROM decryption module 212, according to one embodiment.

The encryption algorithm module 200 may apply an Advanced Encryption Standard (AES) algorithm (e.g., known as Rijndael) to encrypt information between the media security circuit 104 and the EEPROM 112 and the flash memory 110. The debug encryption module 202 may encrypt an information (e.g., data, records, etc.) that may be communicated between the media security circuit 104 and the external hardware circuit 108. The debug decryption module 204 may decrypt an information that may be communicated between the media security circuit 104 and the external hardware circuit 108. The flash encryption module 206 may encrypt an information that may be communicated between the media security circuit 104 and the flash device 110. The flash decryption module 208 may decrypt information that may be communicated between the media security circuit 104 and the flash device 110. The EEPROM encryption module 210 may encrypt a stored information that may be communicated between the media security circuit 104 and the EEPROM device 112. The EEPROM decryption module 212 may decrypt a stored information (e.g., records, data, etc.) that may be communicated between the media security circuit 104 and the EEPROM device 112.

In example embodiment, the media security circuit 104 may provide the pointer location of the memory having the debug master key to the external hardware circuit 108 through the debug interface 106. The debug encryption module 202 may be used to encrypt the incoming data bits. The debug decryption module 204 may be used to decrypt the incoming data bits. The flash encryption module 206 and the flash decryption module 208 may interact with the flash 110 to store the debug master key and also to encrypt/decrypt the information from flash 110. The EEPROM encryption module 210 and the EEPROM decryption module 212 may interact with the EEPROM 112 to store the debug master key and also to encrypt/decrypt the information from the EEPROM device.

In one embodiment, the debug encryption module 202 may encrypt and the debug decryption module 204 may decrypt information communicated between the media security circuit 104 and the external hardware circuit 108 using the debug master key. The flash encryption module 206 may encrypt and the flash decryption module 208 may decrypt the content information communicated between the media security circuit 104 and a flash device 110. The EEPROM encryption module 210 may encrypt and the EEPROM decryption module 212 may decrypt a stored information communicated between the media security circuit 104 and the EEPROM device 112. The external hardware circuit 108 may include the debug encryption module 202 and the debug decryption module 204. The debug master key may be securely programmed in the external hardware circuit 108.

Figure 3:
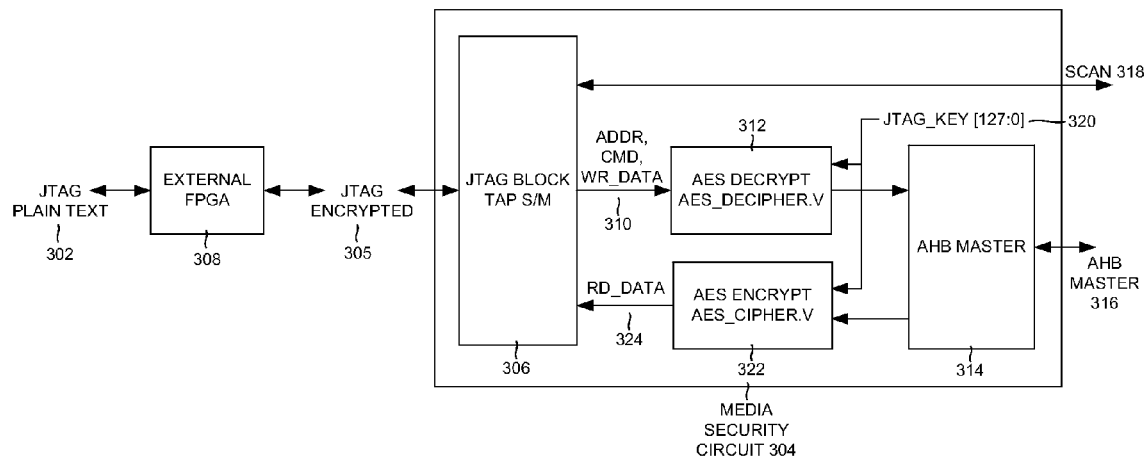
FIG. 3 is a system view of movement of JTAG plain text movement to media security circuit through external FPGA, according to one embodiment.

FIG. 3 is a system view of movement of JTAG plain text movement to media security circuit through external FPGA, according to one embodiment. Particularly, FIG. 3 illustrates JTAG plain text 302, a media security circuit 304, a JTAG encrypted 305, JTAG block TAP S/M 306, external FPGA 308, ADDR, CMD, WR_DATA line 310, AES DECRYPT AES_DECIPHER.V 312 block 312, a AHB master 314, a AHB master 316, a scan 318, a JTAG_KEY [127:0] 320, AES ENCRYPT AES_CIPHER.V block 322, and RD_DATA line 324, according to one embodiment.

The JTAG plain text 302 may be a data (e.g., media data, etc.) of the debug interface. The media security circuit 304 may generate a master key to encrypt the JTAG data. The JTAG encrypted 305 may be an encrypted JTAG plain text. The JTAG block TAP S/M 306 may be an interface between the media security circuit and the external FPGA 308. The external FPGA 308 may be used to encrypt an incoming data bit (e.g., JTAG plain text 302) communicated to the media security circuit 304. The ADDR, CMD, WR_DATA line 310 may use ADDR, CMD and WR_DATA signals to notify AES DECRYPT AES_DECIPHER.V block. The AES DECRYPT AES_DECIPHER.V block 312 may be used to decrypt the data (e.g., the encrypted JTAG data) using Advanced Encryption Standard (AES) algorithm. The AHB master block 314 may be a high performance bus chip for data transmission. The AHB master 316 may be a high performance bus for data transmission. The scan 318 may be a signal that may enable JTAG block TAP S/M 306 to scan the data (e.g., the encrypted JTAG data, the decrypted JTAG data). The JTAG_KEY [127:0] block 320 may provide 128 bit encryption key to the AES ENCRYPT AES_CIPHER.V block 322 and AES DECRYPT AES_DECIPHER.V block 312. The AES ENCRYPT AES_CIPHER.V block 322 may be used to encrypt the data (e.g., the JTAG plain text) using Advanced Encryption Standard (AES) algorithm by using JTAG_KEY [127:0] 320. The RD_DATA line 324, may be a signal to enable JTAG BLOCK TAP S/M for reading data, according to one embodiment.

In an example embodiment, JTAG plain text 302 may be encrypted by external FPGA 308 and the encrypted JTAG data may be sent to the media security circuit 304. The media security circuit may use AES ENCRYPT AES_CIPHER.V block 322 and AES DECRYPT AES_DECIPHER.V 312 to perform encryption and decryption on the data using JTAG_KEY [127:0] 320 through AHB MASTER block 314.

Figure 4:
FIG. 4 is a table view of debug interface signal, according to one embodiment.

FIG. 4 is a table view of debug interface signal 450, according to one embodiment. Particularly FIG. 4 illustrates a signal filed 402, a DIR field 404, a filed to/from 406, and a description filed 408, according to one embodiment.

The signal field 402 may be signals on various pins. The DIR field 404 may explain the direction of flow of signals. The field to/from 406 may explain the field from where the signals flow to/out of the pin. The description filed 408 may state the functions or description of particular pins.

In an example embodiment, the table debug interface signal 450 shows different kinds of data between the debug interface (e.g., JTAG interface) and the external FPGA. The signal field 402 has AHB MASTER I/F (e.g., advanced high performance bus), TDI pin, TDO pin, TCK pin, TMS pin, TRST_N pin, and scan control signals. The DIR 404 field may show IN/OUT indicating the direction of flow of signals. The to/from field 406 displays I/O pad indicating the flow is to/from the I/O pad. The description field 408 may state "this block can act as master on the AHB bus" for AHB master I/F signal, "JTAG data input" for TDI pin, "JTAG data output" for TDO pin, "JTAG clock" for TCK pin, "JTAG mode select" for TMS pin, "JTAG reset" for TRST_N pin and "to be defined" for scan control signals.

Figure 5:
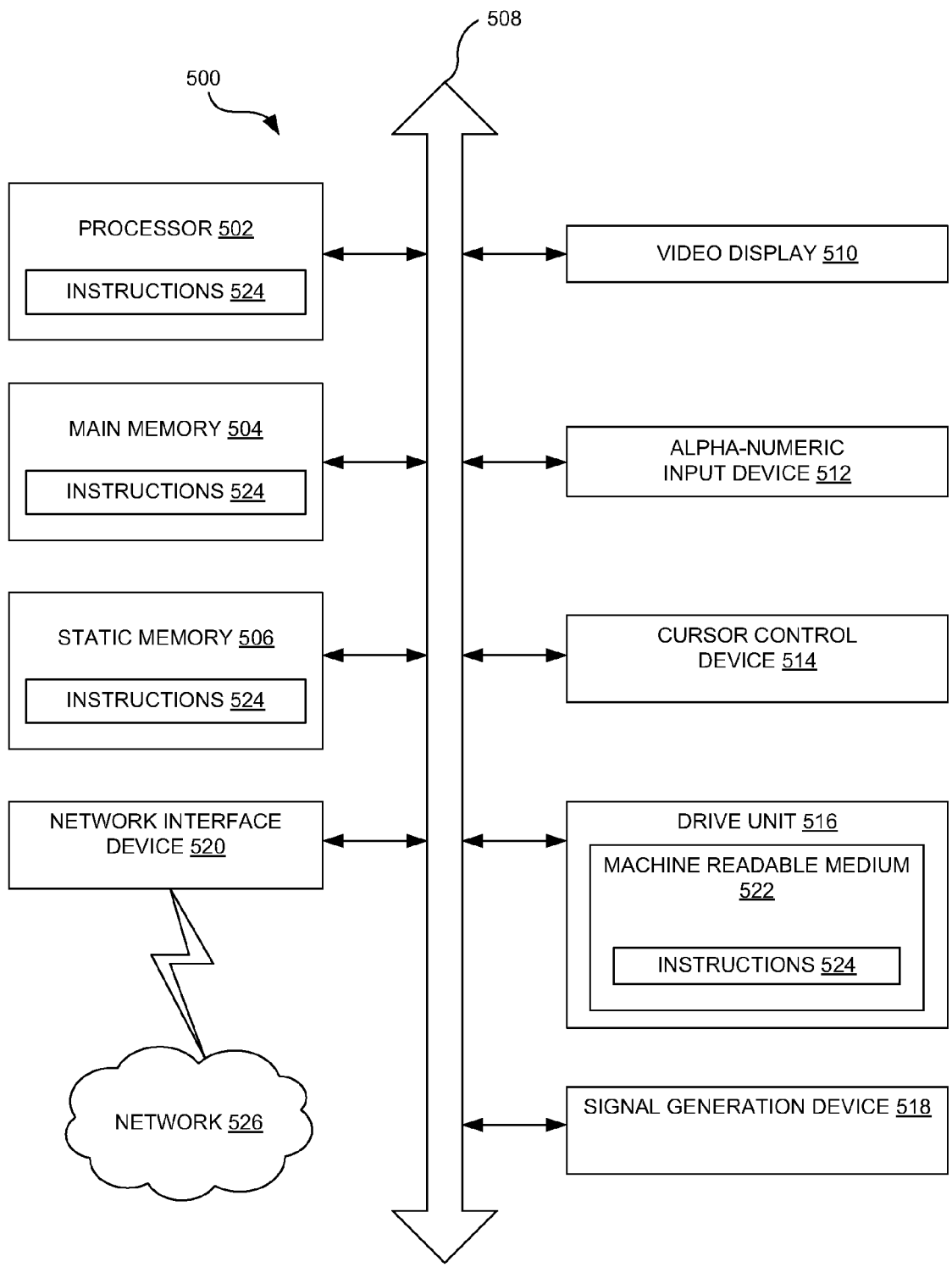
FIG. 5 is a is a diagrammatic system view of a data processing system in which any of the embodiments disclosed herein may be performed, according to one embodiment, according to one embodiment

FIG. 5 is a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or the data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system.

The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, a keyboard and/or any other input device of text (e.g., a special device to aid the physically handicapped).

The cursor control device 514 may be a pointing device such as a mouse. The drive unit 516 may be the hard drive, a storage system, and/or other longer term storage subsystem. The signal generation device 518 may be a bios and/or a functional operating system of the data processing system. The network interface device 520 may be a device that performs interface functions such as code conversion, protocol conversion and/or buffering required for communication to and from the network 526. The machine readable medium 522 may provide instructions on which any of the methods disclosed herein may be performed. The instructions 524 may provide source code and/or data code to the processor 502 to enable any one or more operations disclosed herein.

Figure 6A:
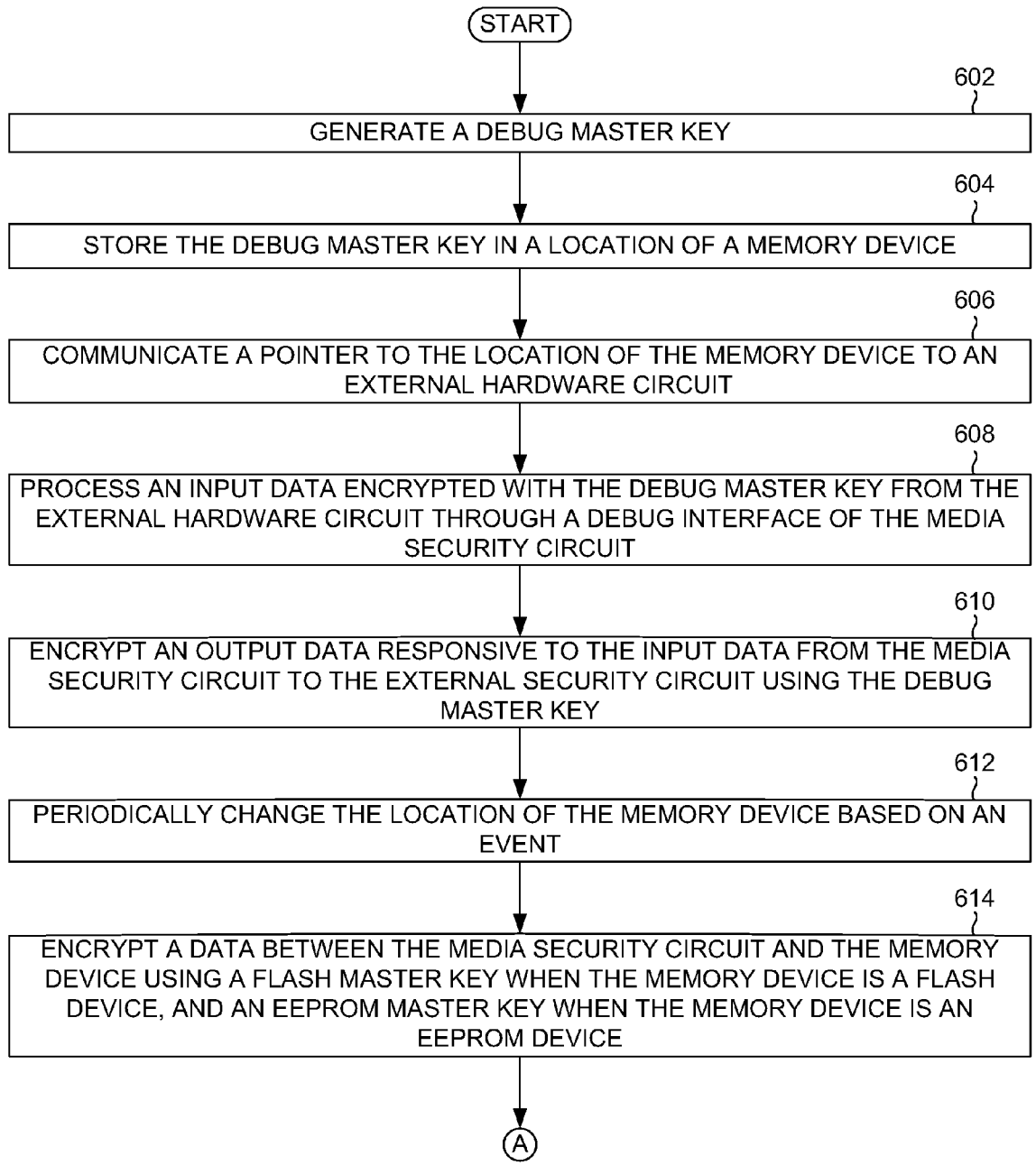
FIG. 6A is a process flow of encrypting a data between a media security circuit and memory device using a flash master key, according to one embodiment.

FIG. 6A is a process flow of encrypting a data between a media security circuit (e.g., the media security circuit 104 of FIG. 1) and memory device using a flash master key, according to one embodiment. In operation 602, a debug master key (e.g., the debug master key may be securely programmed in the external hardware circuit such that the external hardware circuit does not need to receive the debug master key from the pointer location) may be generated by a media security circuit 106. In operation 604, the debug master key may be stored in a location of a memory device (e.g., the flash 110, and/or the EEPROM 112). In operation 606, a pointer to the location of the memory device may communicate to an external hardware circuit (e.g., the external hardware circuit 108 of FIG. 1). In operation 608, an input data encrypted with the debug master key from the external hardware circuit 108 through a debug interface of the media security circuit 100 may be processed (e.g., using a host processor 114 of FIG. 1). In operation 610, an output data responsive to the input data from the media security circuit 100 to the external security circuit using the debug master key may be encrypted (e.g., using an external hardware circuit 108 of FIG. 1). In operation 612, the location of the memory device based on an event may be changed periodically (e.g., using the media security circuit 100 of FIG. 1). In operation 614, a data between the media security circuit and the memory device may be encrypted using a flash master key (e.g., using the encryption algorithm module 200 of FIG. 2) when the memory device may be a flash device, and/or an EEPROM master key when the memory device may be an EEPROM device (e.g., Advanced Encryption Standard (AES) algorithm may be used).

Figure 6B:
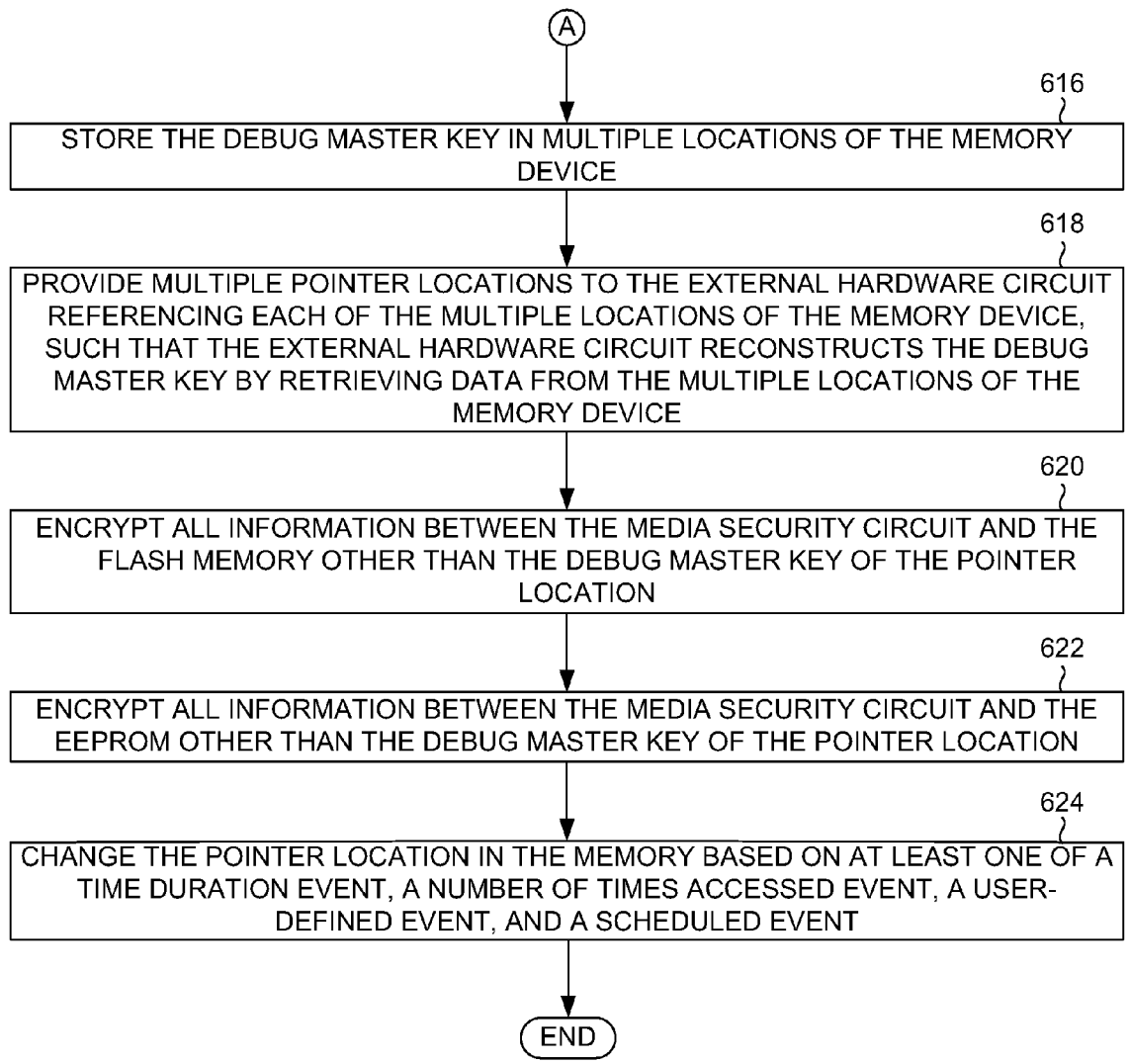
FIG. 6B is a continuation of process flow illustrated in FIG. 6A showing additional process, according to one embodiment.

FIG. 6B is a continuation of process flow illustrated in FIG. 6A showing additional process, according to one embodiment. In operation 616, the debug master key may be stored in multiple locations of the memory device (e.g., the flash 110 and/or EEPROM 112 of FIG. 1). In operation 618, multiple pointer locations to the external hardware circuit referencing each of the multiple locations of the memory device (e.g., the memory device may be any one of a flash memory 110 and an EEPROM 112) may be provided (e.g., such that the external hardware circuit reconstructs the debug master key by retrieving data from the multiple locations of the memory device). In operation 620, information between the media security circuit 104 and the flash memory 110 may be encrypted (using the encryption algorithm module 200 of FIG. 2) other than the debug master key of the pointer location. In operation 622, information (e.g., information between the media security circuit and the EEPROM and the flash memory may be encrypted using an Advanced Encryption Standard (AES) algorithm) between the media security circuit 104 and the EEPROM 112 may be encrypted other than the debug master key of the pointer location. In operation 624, the pointer location may be changed in the memory based on a time duration event, a number of times accessed event, a user-defined event, and a scheduled event.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., Application Specific Integrated Circuitry (ASIC) and/or in Digital Signal Processor (DSP) circuitry). For example, the encryption algorithm module 200, the debug encryption module 202, the debug decryption module 204, the flash encryption module 206, the flash decryption module 208, the EEPROM encryption module 210, and the EEPROM decryption module 212 of FIG. 1-6B may be enabled using a encryption algorithm circuit, a debug encryption circuit, a debug decryption circuit, a flash encryption circuit, a flash decryption circuit, a EEPROM encryption circuit, and a EEPROM decryption circuit, and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A system comprising:
 a host processor;
 a media security circuit;
 a debug interface associated with the media security circuit, the debug interface configured to enable debugging associated with the media security circuit;
 a memory to store a debug master key at a pointer location thereof; and
 an external hardware circuit configured to encrypt an incoming data bit communicated to the debug interface using the debug master key stored at the pointer location of the memory and to decrypt an outgoing data bit from the debug interface using the debug master key, the media security circuit being configured to provide the pointer location of the memory including the debug master key to the external hardware circuit, and the processor being configured to execute instructions associated with the encryption and the decryption.

2. The system of claim 1, wherein the debug master key is stored at multiple locations of the memory such that multiple pointer locations are provided by the media security circuit to the external hardware circuit referencing each of the multiple locations, and such that the external hardware circuit is configured to reconstruct the debug master key by retrieving data from the multiple locations of the memory.

3. The system of claim 1, wherein the memory is at least one of a flash memory and an Electrically Erasable Programmable Read-Only Memory (EEPROM).

4. The system of claim 3, wherein all information between the media security circuit and the flash memory is encrypted other than the debug master key of the pointer location.

5. The system of claim 3, wherein all information between the media security circuit and the EEPROM is encrypted other than the debug master key of the pointer location.

6. The system of claim 3, wherein information between the media security circuit and the at least one of the EEPROM and the flash memory is encrypted using an Advanced Encryption Standard (AES) algorithm.

7. The system of claim 1, wherein the pointer location is changed in the memory based on at least one of a time duration event, a number of times accessed event, a user-defined event, and a scheduled event.

8. The system of claim 1, wherein the debug master key is securely programmed in the external hardware circuit such that a need associated with the external hardware circuit to receive the debug master key from the pointer location is dispensed with.

9. A method of a media security circuit, comprising:
 generating a debug master key;
 storing the debug master key in a location of a memory device;
 communicating a pointer to the location of the memory device to an external hardware circuit;
 processing an input data encrypted with the debug master key from the external hardware circuit through a debug interface associated with the media security circuit, the debug interface being configured to enable debugging associated with the media security circuit;
 encrypting an output data responsive to the input data from the media security circuit to the external hardware circuit using the debug master key; and
 periodically changing the location of the memory device based on an event.

10. The method of claim 9, further comprising:
encrypting a data between the media security circuit and the memory device using a flash master key when the memory device is a flash device, and an EEPROM master key when the memory device is an EEPROM device.

11. The method of claim 9, further comprising:
storing the debug master key in multiple locations of the memory device; and
providing multiple pointer locations to the external hardware circuit referencing each of the multiple locations of the memory device such that the external hardware circuit is configured to reconstruct the debug master key by retrieving data from the multiple locations of the memory device.

12. The method of claim 9, wherein the memory device is at least one of a flash memory and an EEPROM.

13. The method of claim 12, further comprising:
encrypting all information between the media security circuit and the flash memory other than the debug master key of the pointer location.

14. The method of claim 12, further comprising:
encrypting all information between the media security circuit and the EEPROM other than the debug master key of the pointer location.

15. The method of claim 12, wherein information between the media security circuit and the at least one of the EEPROM and the flash memory is encrypted using an AES algorithm.

16. The method of claim 9, further comprising:
changing the pointer location in the memory based on at least one of a time duration event, a number of times accessed event, a user-defined event, and a scheduled event.

17. The method of claim 9, comprising securely programming the debug master key in the external hardware circuit such that a need associated with the external hardware circuit to receive the debug master key from the pointer location is dispensed with.

18. A media security circuit comprising:
a debug interface to enable debugging of the media security circuit;
a debug encryption module to encrypt and a debug decryption module to decrypt an information communicated between the media security circuit and an external hardware circuit through the debug interface using a debug master key;
a memory encryption module to encrypt and a memory decryption module to decrypt a content information communicated between the media security circuit and a memory, the memory being configured to store the debug master key at a pointer location thereof, and the media security circuit being configured to provide the pointer location of the memory including the debug master key to the external hardware circuit.

19. The media security circuit of claim 18, wherein the memory includes at least one of a flash memory and an EEPROM.

20. The media security circuit of claim 18, wherein the debug master key is securely programmed in the external hardware circuit such that a need associated with the external hardware circuit to receive the pointer location of the memory is dispensed with.

* * * * *